No. 834,842. PATENTED OCT. 30, 1906.
F. J. NUTTING.
MACHINE FOR MAKING HARNESS SNAPS.
APPLICATION FILED SEPT. 11, 1905.

10 SHEETS—SHEET 1.

WITNESSES
INVENTOR
ATTORNEY

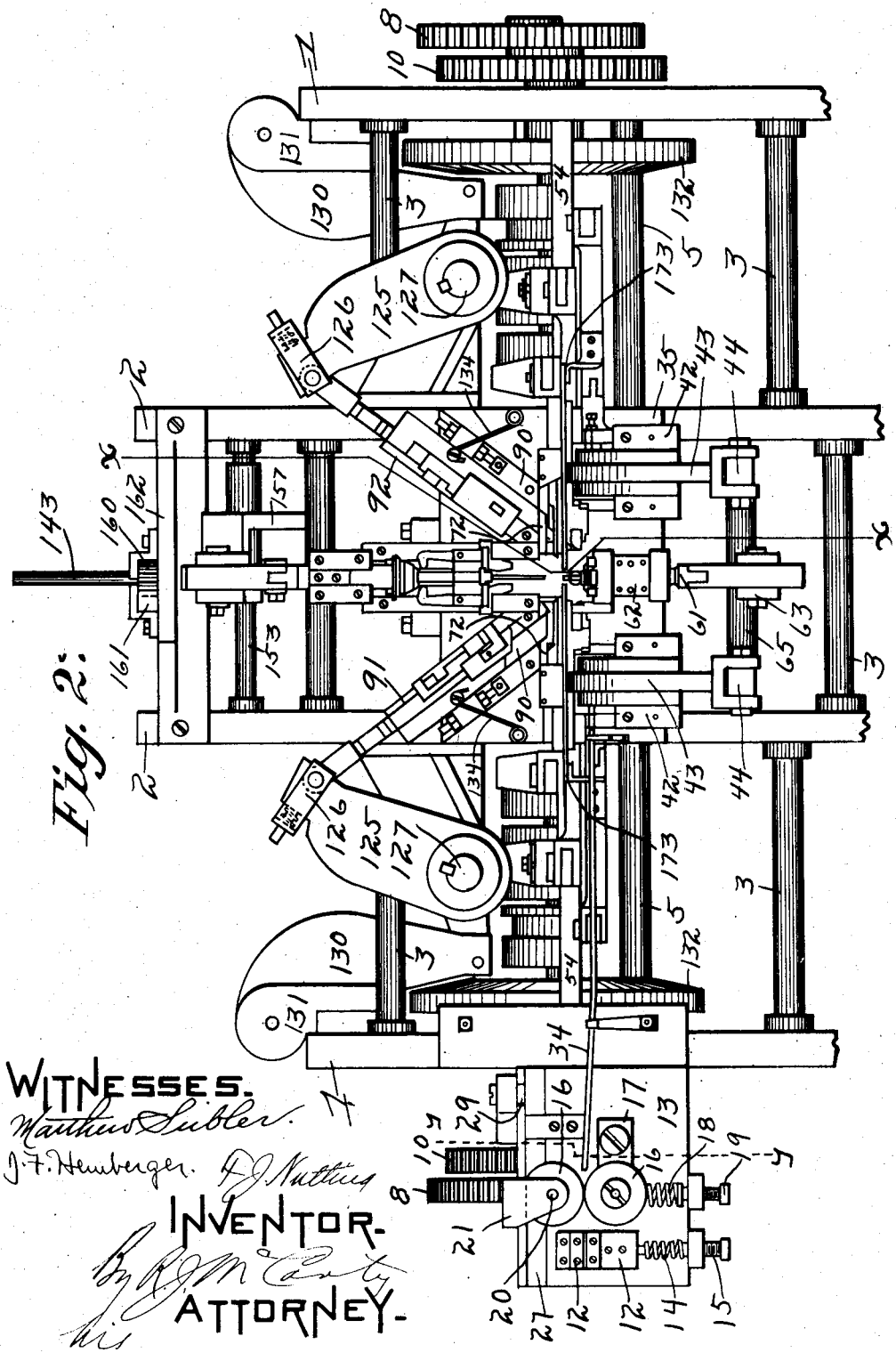

No. 834,842. PATENTED OCT. 30, 1906.
F. J. NUTTING.
MACHINE FOR MAKING HARNESS SNAPS.
APPLICATION FILED SEPT. 11, 1905.
10 SHEETS—SHEET 3.
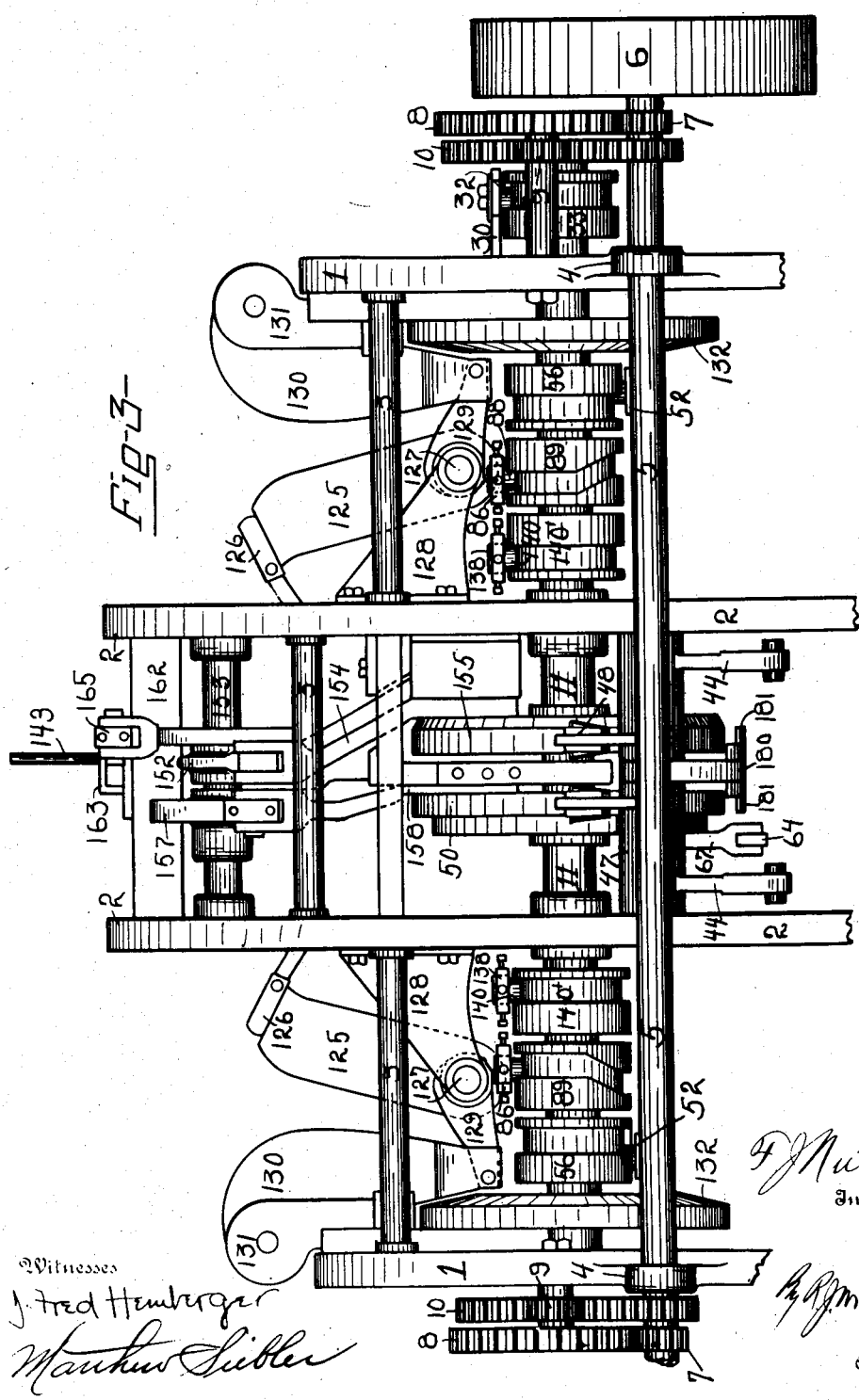

No. 834,842. PATENTED OCT. 30, 1906.
F. J. NUTTING.
MACHINE FOR MAKING HARNESS SNAPS.
APPLICATION FILED SEPT. 11, 1905.
10 SHEETS—SHEET 4.
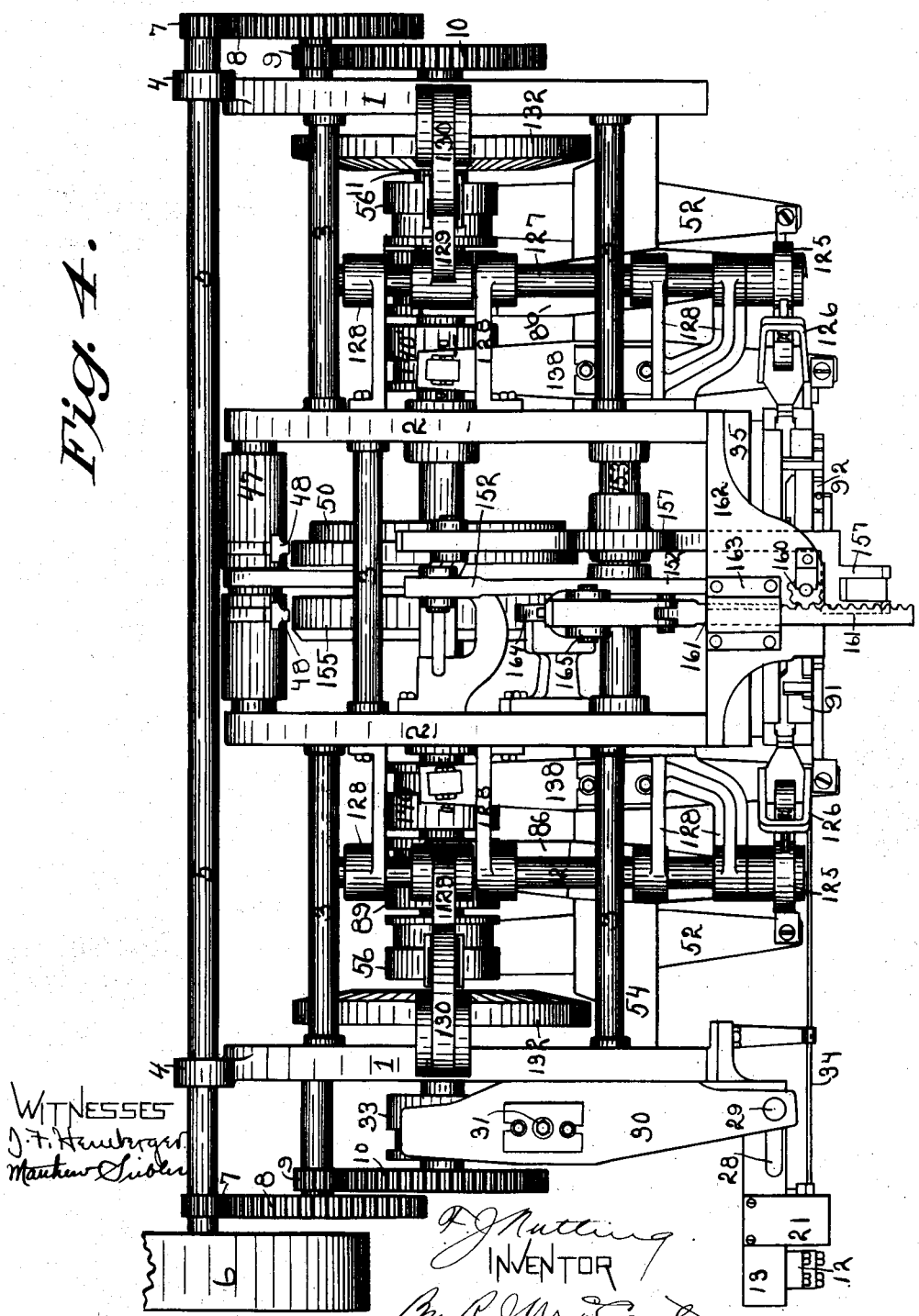

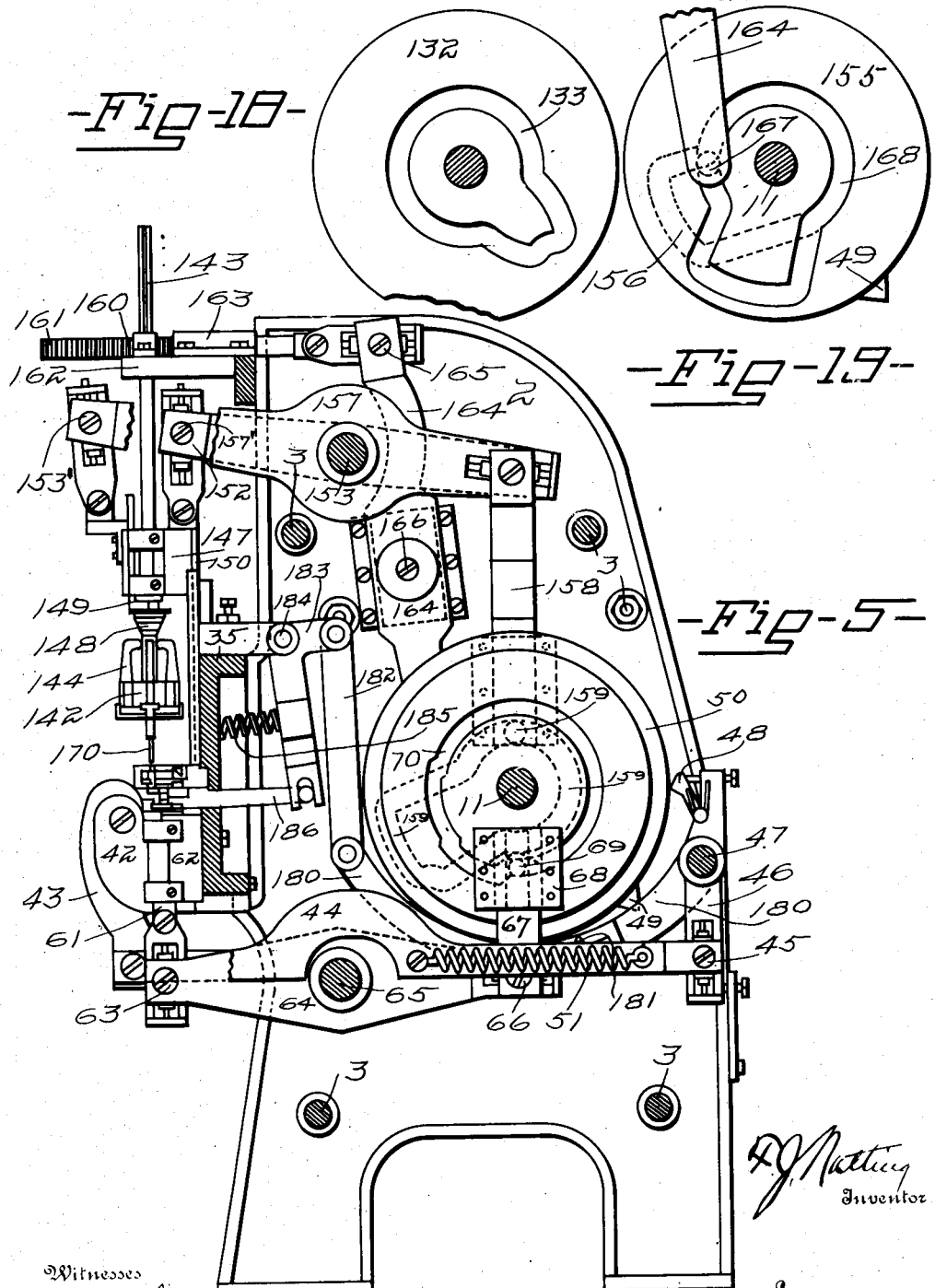

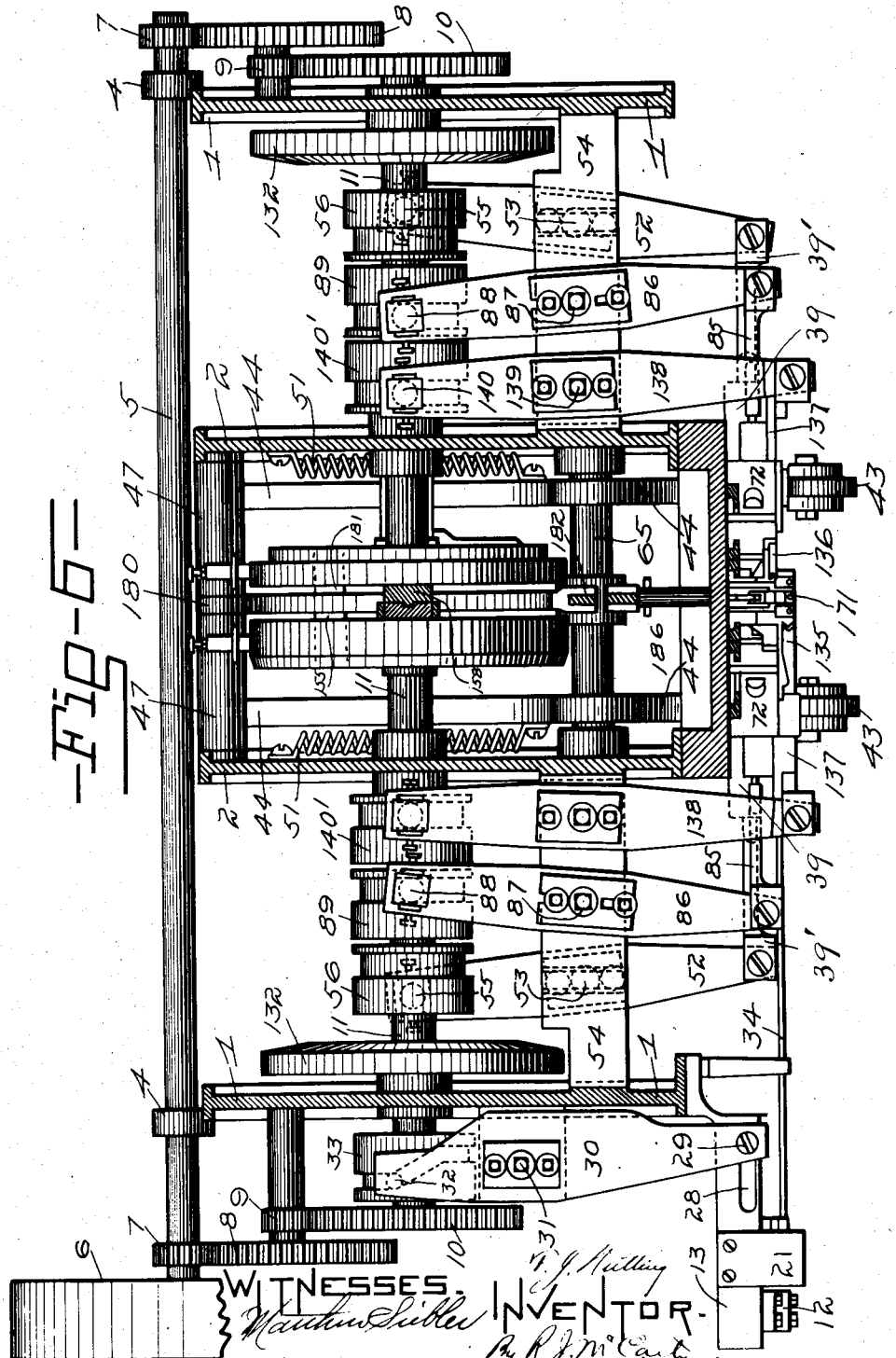

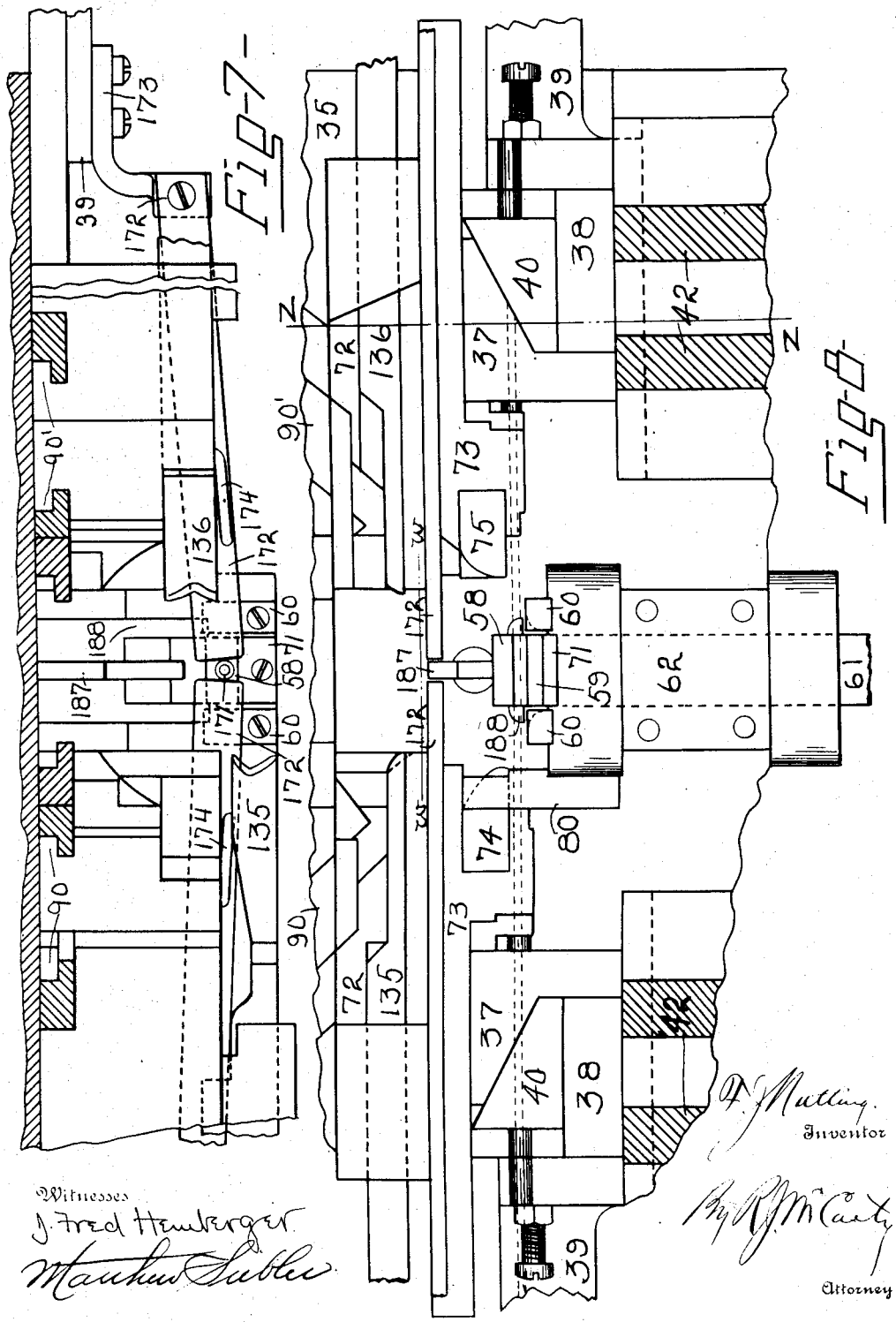

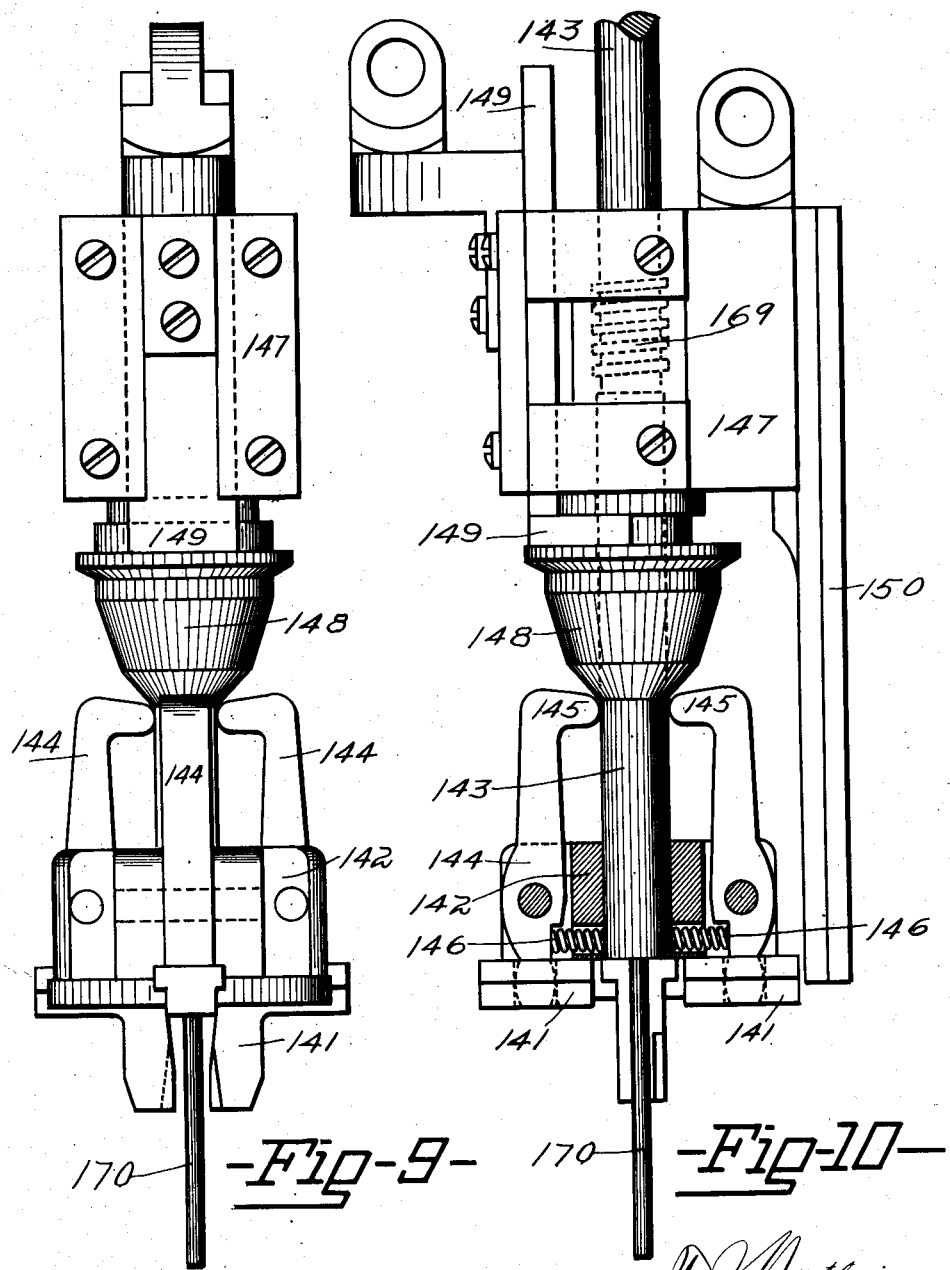

No. 834,842. PATENTED OCT. 30, 1906.
F. J. NUTTING.
MACHINE FOR MAKING HARNESS SNAPS.
APPLICATION FILED SEPT. 11, 1905.
10 SHEETS—SHEET 9.
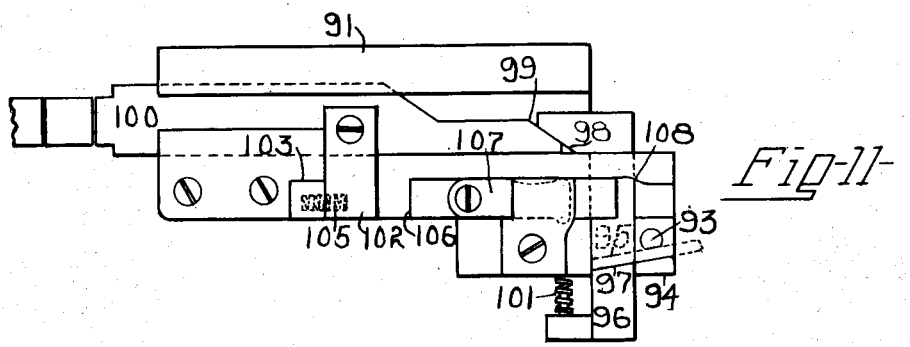
*Fig-11-*
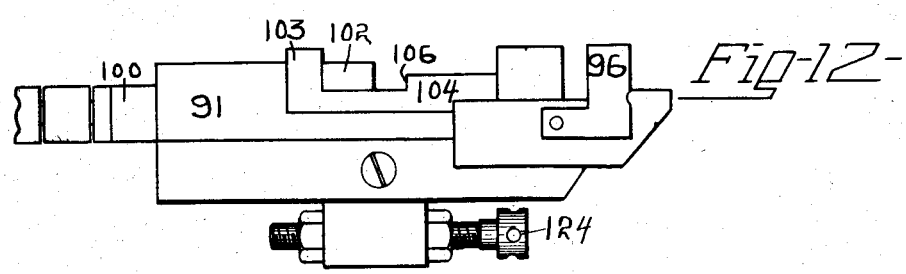
*Fig-12-*
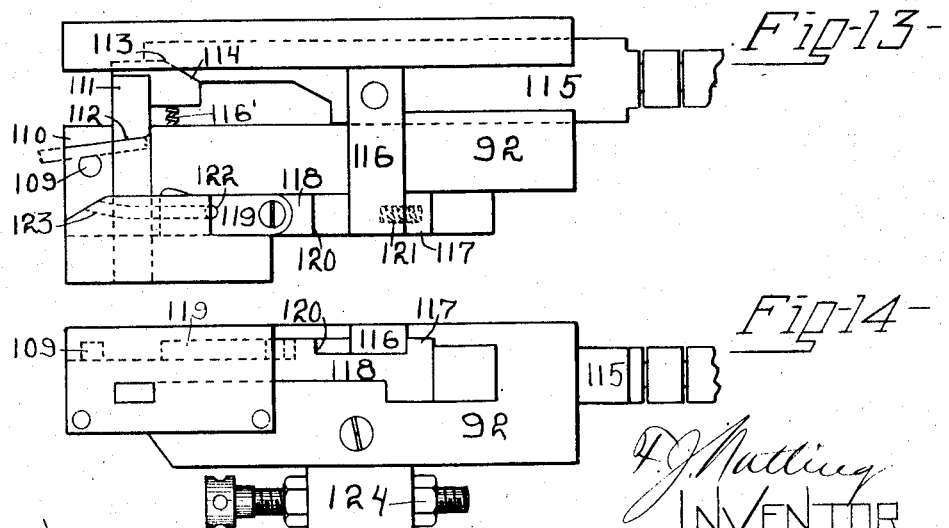
*Fig-13-*
*Fig-14-*
WITNESSES
INVENTOR
ATTORNEY No. 834,842. PATENTED OCT. 30, 1906.
F. J. NUTTING.
MACHINE FOR MAKING HARNESS SNAPS.
APPLICATION FILED SEPT. 11, 1905.
10 SHEETS—SHEET 10.
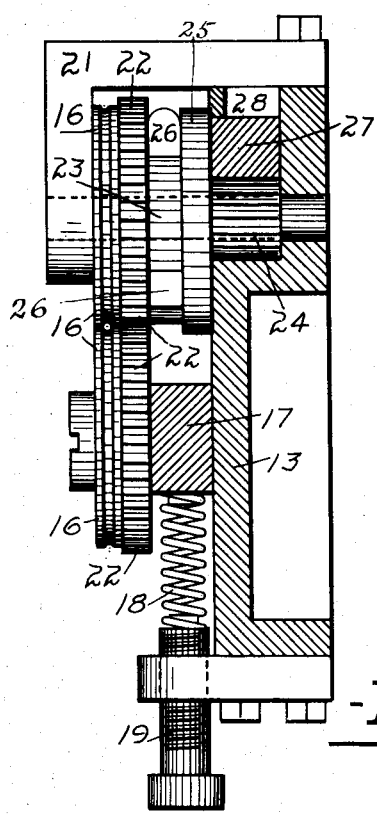
Fig-15-
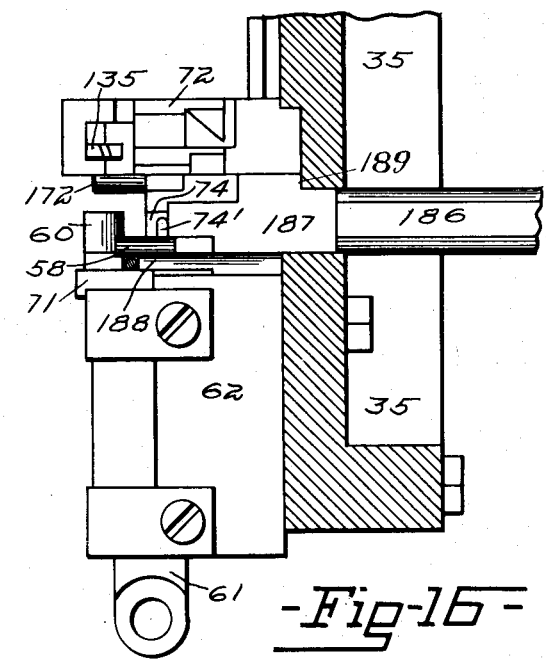
Fig-16-
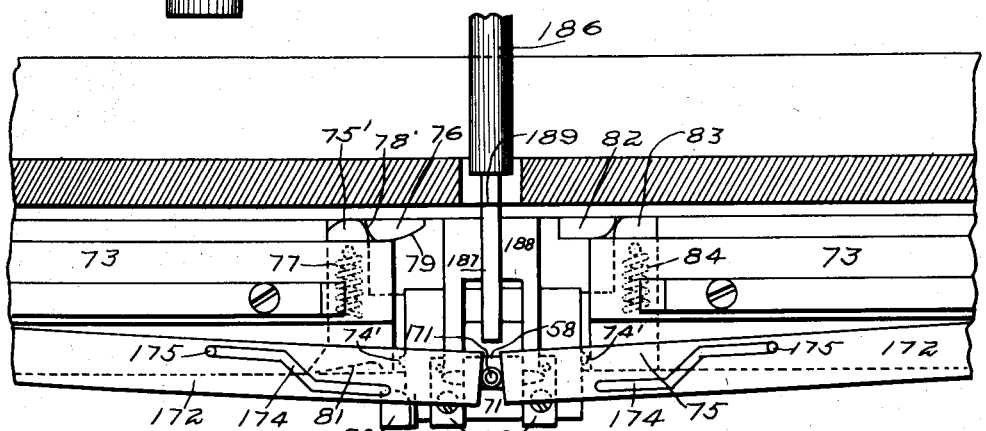
Fig-17-

UNITED STATES PATENT OFFICE.

FREDERICK J. NUTTING, OF DAYTON, OHIO.

MACHINE FOR MAKING HARNESS-SNAPS.

No. 834,842. Specification of Letters Patent. Patented Oct. 30, 1906.

Application filed September 11, 1905. Serial No. 278,021.

*To all whom it may concern:*

Be it known that I, FREDERICK J. NUTTING, a citizen of the United States, residing at Dayton, in the county of Montgomery and State of Ohio, have invented certain new and useful Improvements in Mechanism for Making Harness-Snaps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for making harness-snaps, and comprises mechanism whereby the stock from which the snaps are formed is successively operated upon to impart the necessary form and resiliency.

Preceding a detail description of the invention reference is made to the accompanying drawings, of which—

Figure 20:
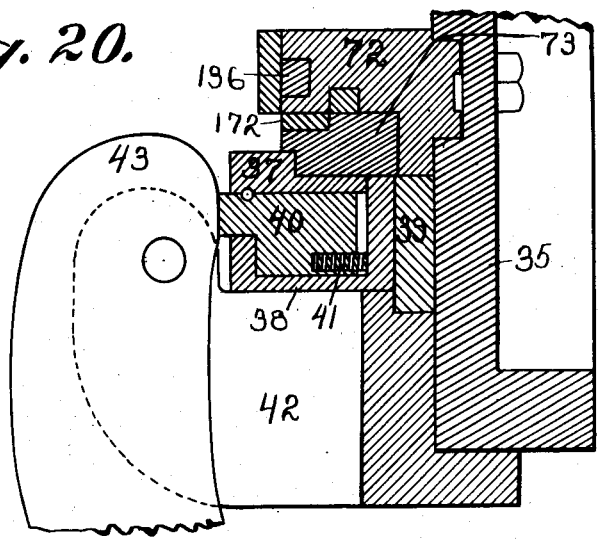
Figure 1:
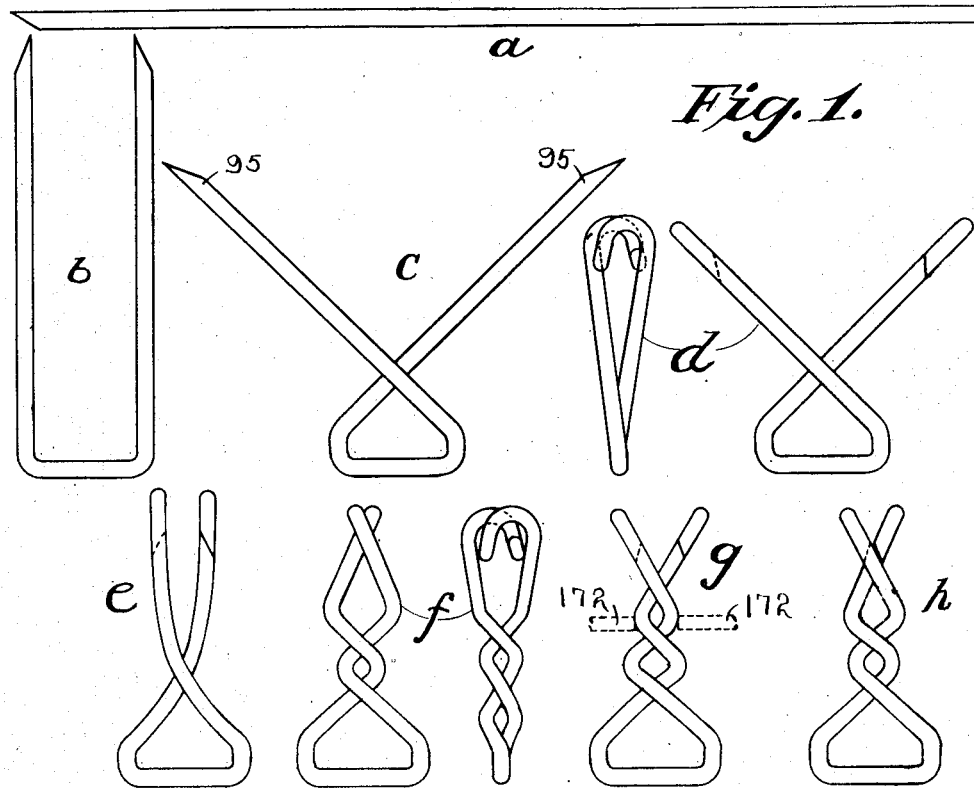

Figure 1 illustrates the various forms imparted to the stock during the successive operations of the machine. Fig. 2 is a front elevation of the machine in its entirety. Fig. 3 is a rear elevation of the same. Fig. 4 is a top plan view of the same. Fig. 5 is a sectional elevation on the line $x$ $x$ of Fig. 2. Fig. 6 is a horizontal sectional elevation on a line above the cams. Fig. 7 is a top plan view of the snap-forming mechanism. Fig. 8 is a front elevation of the anvil and snap-forming mechanism. Figs. 9 and 10 are details of the twisting mechanism. Figs. 11, 12, 13, and 14 are detail views of the hook-forming dies. Fig. 15 is a detail of the wire-feeding mechanism, showing a section on the line $y$ $y$ of Fig. 2. Fig. 16 is a detail of the kick-off mechanism by which the finished snaps are removed from the machine. Fig. 17 is a sectional view taken on the line $w$ $w$ of Fig. 8. Fig. 18, Sheet 5, is a detail of the cam operating the hook-forming dies shown on Sheet 9. Fig. 19, Sheet 5, is a detail of the cam operating the wire-cutter, the kick-off, the twister, and the clutch-jaws. Fig. 20, Sheet 1, is a section through the cutting mechanism on the line $z$ $z$ of Fig. 8.

In a detail description of the invention similar reference characters indicate corresponding parts.

1 1 and 2 2 respectively designate end and middle standards connected by distance-studs 3. The end standards 1 1 have bearings 4 for the main power-shaft 5. Said shaft is driven from a line-shaft through pulley 6. Power is transmitted to the main actuating or cam shaft 11 through gears 7, 8, 9, and 10. Upon shaft 11 are mounted a series of cams, to be hereinafter referred to and which perform the various operations of the machine.

Referring to Fig. 2, it will be noted that the feeding and tension mechanisms are mounted on the extreme left-hand standard 1. The tension mechanism consists of two blocks 12 12, mounted on a plate 13 in such a manner that they form tension-jaws whose tension is regulated by means of a spring 14 and screw 15. The wire after leaving the tension-jaws passes through two feed-rollers 16 16. The lower roller has a pivotal mounting 17 on the plate 13. (See Figs. 2 and 15.) The pressure on the wire between these two rollers is produced through spring 18 and screw 19. The upper roller is mounted on a pivot 20, which has bearings in projection 21 and plate 13. On the rear of and fastened to said rollers 16 16 are two intermeshing gears 22 22. The upper one of said rollers carries a ratchet 23. Mounted on pivot 20 is a pinion 24, which is fastened to a disk 25, that carries ratchet-pawls 26, which engage the ratchet 23. The pinion 24 meshes with a rack 27, which has a sliding bearing in the plate 13. Projecting upwardly from said rack 27, through a slot 28 in plate 13 is a pin 29, which is mounted on lever 30, that has a fulcrum at 31 on a projection on left-hand standard 1. (See Figs. 4 and 6.) The rear end of lever 30 bears a pin and roller 32, which rides in a cam-slot in cylinder-cam 33, mounted on shaft 11. (See Fig. 6.) Through the above mechanism the feed-rollers 16 16 are actuated to feed the desired length of wire for the formation of each snap.

The wire is fed through a tube 34 to the cutting mechanism, mounted on plate 35 on the middle standards 2 2. Said cutting mechanism consists of stationary cutting-dies 37 37, rigidly mounted in a bearing-box 38 on the sliding arms 39. (See Figs. 7, 8, and 20.) Also mounted in the bearing-box 38 are sliding cutting-dies 40, which are normally pressed outwardly by springs 41. The shearing planes of these dies are inclined to the horizontal to produce a bevel cut to the wire, as shown at $a$, Fig. 1. Projecting from plate 35 are supports 42, which carry cam-levers 43, which bear against the movable dies 40 of the cutters. The lower ends of said levers are connected to thrust-rods 44, which have an adjustable connection 45 with a lever 46, pivoted on shaft 47. (See Fig. 5.) The upper end of each lever 46 has an adjustable engaging member 48, which is engaged by cam projections 49 on multiple cams 50 and 155, mounted on shaft 11. (See Figs. 5, 6, and 19.) Springs 51 hold levers 46 and thrust-rods 44 and the cam-levers 43 in operative positions in relation to the cam projections 49. Both of the cutters have similar mechanisms, as described above. The movable die 40 is given an inward movement through this mechanism to sever the wire. After the cutting operation the dies 40 and 37 are moved outwardly in order that the wire may be bent, as shown at b in Fig. 1. As before stated, the dies are mounted in boxes 38, connected with sliding arms 39, mounted on the plate 35, as shown in Fig. 20. The outer ends of these slides or arms 39 are connected by a link 39' to levers 52, mounted between standards 1 2. (See Fig. 6.) These levers carry on their outer ends studs and rollers 55, which engage cams 56 on the shaft 11. Said cams are so set that they move the cutters 37 and 40 inwardly immediately before the wire is fed and outwardly immediately after the cutting of the wire. Situated midway between the two cutting-dies is an anvil-housing 62, suitably mounted on plate 35. (See Figs. 2, 7, 8, and 16.) The wire in being fed passes between lips 58 and 59 and over dies 60 on either side of lips 58 and 59. The said lips are fastened to a plunger 61, having bearings in housing 62 on plate 35. The lower end of the plunger 61 is adjustably connected at 63 to lever 64, lever 64 being pivoted at 65 and having at the other end adjustable connections 66 to cam-slide 67. The said cam-slide 67 is mounted in housing 68 on the right-hand middle standard 2. The said cam-slide carries a pin and roller 69, which rides in cam-groove 70 of the multiple cam 50.

Through the above-described mechanism the lips 58 and 59 are given a downward thrust. In consequence of this movement the wire is bent between the dies 60 in the form shown at b in Fig. 1. The plate 71 holds the wire rigidly on the upper lip 58 during the operations on the upper ends of the wire.

The next movement necessary in the formation of the snap is the cross-bend (shown at c in Fig. 1) to form the loop, which is done as follows: Mounted on the plate 35 are blocks 72, which form bearings for sliding members 73, carrying the bending-dies 74 and 75, which produce the cross-bend in the wire, as at c, Fig. 1. As one end of the wire is passed back of the other and across it is necessary that the dies 74 and 75 shall have a different operation. I will first describe the left-hand die 74, which bends the wire back and across. This die 74, as shown in Fig. 17, has a rearwardly-projecting cam-surface 75', which is held in contact with a cam 76 on plate 35 by means of a spring 77. When in this position, the face of the die 74 is flush with the outer face of the block 72. This position is necessary to allow the wire to pass in front of the die 74 in feeding and bending the wire. In the inward movement of the die-support or sliding member 73 to bend the wire the die 74 moves outwardly to catch the same. This outward movement is given the die by the cam-surface 78 of cam projection 76. The die 74 then moves rearwardly and inwardly along the cam-surface 79 on the cam projection 76 to produce the cross. In order to facilitate this rearward movement of said die with exactness, I provide an upwardly-projecting post 80, mounted on housing 62. This post engages the cam-surface 81 of the bending-die 74 to initiate the rearward movement along the cam-surface 79. Referring to the movement of the right-hand die 75, it differs from that of the left-hand die in that it moves outwardly to catch the wire and then inwardly, but not rearwardly, to cross the wire in front of the wire bent by the left-hand die 74. This outward movement of the die 75 is produced by the cam projection 82 on the plate 35 engaging the cam extension 83 of die 75. (See Fig. 17.) The spring 84 holds the cam-surfaces of the cam projections 82 and 83 in contact. The bending-dies 74 and 75 have suitable grooves 74' for engaging the wire. These die-supports 73 are given their inward movement to operate the bending-dies through arms 85. These arms 85 are connected to levers 86, fulcrumed at 87 on plates 54. The necessary movement is given to these levers 86 through studs and rollers 88, operating in cams 89 on shaft 11. Slidingly mounted on plate 35 in ways 90 and 90' are housings 91 and 92, which contain the hook-forming dies. Since the hooks on the snap are right and left, it is necessary that the construction of said hook-formers is somewhat different. I will first describe the left-hand die. This die is shown in detail in Figs. 11 and 12, where 93 designates a pin rigidly mounted on the housing around which the wire is bent. During the formation of the cross-bend, as above described, the housings 91 and 92 have moved down by means hereinafter described, so that the upper ends 95 of the wire lie between the pin 93 and a projection 94 of the housing 91. Slidingly mounted in the housing 91 is a die 96, having a shoulder 97, which lies in the path of the wire in bending the same around the pin 93. The inner end of the die 96 has a bevel cam-surface 98, which coöperates with a similar cam-surface 99 on a sliding arm 100. The cam-surfaces 98 and 99 are held in contact by a spring 101. As the arm 100 is given a downward movement by means hereinafter described the shoulder 97 of the bending-die 96 is moved inwardly toward the wire across the pin 93. On slide-arm 100 is a projecting bar 102. It will be noted that the projection 102 when in its upward position lies against a projection 103 on a plate 104 which is set within the housing 91. On the downward movement of the sliding member 100 the projection 102 moves away from the projection 103 on the plate 104. Plate 104 is prevented from immediately following the downward movement of the member 100 by a spring 105. This delay in the downward movement of plate 104 is necessary in order that the wire may be given its initial bend across the pin 93 by the bending-die 96, as above described. When the downward movement of the sliding member 100 has produced this initial bend in the wire, the projection 102 has come in contact with shoulder 106 on plate 104, and any further downward movement of the arm 100 will also move downward the plate 104. Pivoted on plate 104 is a bending-pawl 107. When the plate 104 moves downward, the pawl 107 will catch the wire which has been bent across its path by die 96 and will bend said wire downwardly around pin 93, completing the hook. It will be noted that the pawl 107 in its downward movement must follow the cam-surface 108, which is of such a nature at its lower end as to throw the pawl 107 inwardly toward pin 93, thus aiding in the bending of the wire. Owing to the elasticity of the wire used in these snaps, it is necessary that the pawl 107 should be given this inward movement around the pin 93, this inward movement compensating for the elasticity of the wire, which tends to throw the hook outwardly after its release.

I will now describe the right-hand die 92, which produces the bend in the wire exactly opposite the one produced by die 91. d, in Fig. 1, shows these opposite bends or hooks in the wire. Referring to Figs. 13 and 14, the die-housing 92 has a pin 109 rigidly projecting therefrom and also a projection 110, between which pin and projection the wire lies to be bent. 111 designates the bending-die, having a shoulder 112, which gives the initial bend to the hook. 113 designates a bevel cam-surface on die 111, which is held in contact by corresponding cam-surface 114 of sliding member 115 by a spring 116'. Sliding member 115 also carries a projecting arm 116, which is mounted in contact with a projection 117 of a plate 118. In the downward movement of the sliding member 115 the shoulder 112 of die 111 bends the wire across the pin 109 and into the path of bending-pawl 119, pivoted on plate 118. The downward movement of plate 118 is given by arm 116 meeting the shoulder 120 on said plate 118. The spring 121 prevents the immediate downward movement of plate 118 until the projecting arm 116 reaches the shoulder 120. In the downward movement of plate 118 the bending-pawl 119 produces the final bend of the wire around the pin 109. The bending-pawl 119 carries a pin 122, which follows a slot 123, which gives the pawl its necessary inward movement to compensate for the elasticity of the wire, as previously described. 124 designates an adjusting-screw on each of the die-housings to adjust the positions of said housing in relation to the wire. The sliding members 100 and 115 are connected to arms 125 by flexible connections 126. These arms 125 are keyed on rock-shafts 127, mounted in brackets 128. At the other ends of shafts 127 are cranks 129, connected to links 130. The said links 130 are connected to cam-slides 131, mounted in housings on end frames 1. The cams 132 operate the slides 131. (Shown in detail in Fig. 18.) 133 designates the cam-slot. Through the above-mentioned means the necessary downward movement is given the slides 100 and 115, the housings 91 and 92 of said dies being forced down by springs 134 to their extreme lower movement. (See Fig. 2.) The extreme lower movement of said housings is limited by blocks 72. When said housings are in their extreme lower positions, they are in position to form the hooks. Before said housings are returned to their upper positions the hooks are lifted from the pins 93 and 109 and bent into the position shown at e in Fig. 1. The following means are employed in the lifting of the hooks from the pins 93 and 109. 135 and 136 designate two sliding arms, mounted in blocks 72 and having connections 137 with levers 138, fulcrumed at 139 on plates 54. (See Fig. 6.) The necessary movements are imparted to these levers by studs and rollers 140, operating in cams 140' on shaft 11. The movement of levers 138 actuates the arms 135 and 136 inwardly to catch the wire and bend it, as shown at e in Fig. 1. Since the two arms of the hook are not in alinement, but are crossed, it necessarily follows that the arms 135 and 136 are not in alinement, as shown in Fig. 7. The wire is now in a position to be twisted. While the hooked ends are being held in position by the arms 135 and 136 the clutch descends. This clutch mechanism is shown in Figs. 9 and 10 and consists of four suitable jaws 141, slidingly mounted in housing 142 on shaft 143. Pivotally mounted within said housing 142 are four levers 144, having their upper ends 145 bent inwardly and held normally in contact with shaft 143 by springs 146. As long as the upper ends of the levers 144 are in contact with the shaft the jaws are open. The clutch is slidingly supported by block 147 in guides 150 and is controlled by a cam mechanism to be described. Slidably mounted on shaft 143 is a cone-shaped cam 148, the movement of said cam being controlled by a slide 149, mounted in block 147. This slide is controlled by cam mechanism, which will now be described. Block 147 is adjustably connected at 157' to a lever 152, fulcrumed at 153. (See Fig. 5.) The other end of said lever has adjustably connected thereto a sliding member 154, which is given movement by the cam 155 on shaft 11 and which has a cam-slot 156. (See Figs. 3 and 19.) Through these means the block 147, together with the clutch, is given its downward movement. At the same time the clutch-controlling slide 149 is moved downwardly with said block 147 through the following means: Slide 149 is adjustably connected, 153', to lever 157, fulcrumed at 153 and connected at its rear end to a slide 158, which is operated by cam 50 on shaft 11, and having a cam-slot 159. The block 147 and slide 149 move together until the clutch is in a position to grasp the wire. At this point the conical cam 148 is given movement along the shaft 143 to spread the upper ends 145 of the jaw-controlling levers 144 to close the jaws 141 on the wire, said wire being shown at *e* in Fig. 1. This movement of the conical cam 148 is given by means of the slide 149 being further depressed through its cam-and-lever movements, as above described. When the clutch has grasped the wire, a twisting movement is given said clutch, as follows: Splined on the upper end of shaft 143 is a pinion 160, meshing with a rack 161. The rack 161 has a bearing on the cross-yoke 162 and is held in engagement with the pinion by housing 163. The rack 161 is given movement through a lever 164, adjustably connected to said rack at 165. The said lever is fulcrumed at 166 and has its lower end carrying a pin and roller 167, riding in cam-slot 168 in cam 155. (Shown in Figs. 5 and 19.) In order to make the spiral part of the snap regular, it is necessary that the clutch shall descend as it twists the wire. This descending movement is given the clutch, while the shaft 143 revolves, by a thread 169 on shaft 143 working in block 147. Projecting from the lower end of shaft 143 is a rod 170, around which the wire is twisted. The lower end of said rod enters an opening 171 in the lip 59, which acts as a bearing for said rod while the clutch is being revolved. It is necessary that the twist should be loose or open in order that the completed snap shall have the necessary resiliency. After the wire has thus been twisted the clutch is released and resumes its upper or normal position through the operation of its cams and connections. After the clutch has reached its upper position it revolves in the opposite direction to that in which the wire was twisted, thereby giving it its normal position.

Owing to the torsional strain produced in twisting the wire, the hooks do not occupy the desired position, but assume a position shown at *f* in Fig. 1. In order to relieve this strain and to produce the desired results, it is necessary that the twisted wire should be strained to the position shown at *g* in Fig. 1. This is accomplished through the following means, (see Figs. 7 and 17:) Mounted in die-supports 73 are two sliding members 172. These sliding members are connected to the cut-off slides 39 at 173, as shown in Fig. 7. These slides 172 have cam-slots 174, in which operate pins 175 on the die-slides 73. Normally the slides lie flush with the die-slides 73 in order not to interfere with the wire when it is being bent up, as shown at *b* in Fig. 1. These cam-slots 174 and pins 175 are therefore necessary to throw the arms 172 outwardly to engage the wire, as shown in Figs. 7 and 17.

Since the slides 172 are connected to the cut-off slides 39, the movement of said slides takes place as the cut-off dies 37 and 40 are being moved inwardly ready to receive the wire for the next snap. After the desired length of wire has been cut off for the formation of the next snap the cut-off dies are moved outwardly, as previously explained, and the slides 172 resume their positions flush with the face of the die-slides 73.

The various operations upon the wire to form a completed snap are now finished, and the snap is now ready to be discharged from the machine. Through the action of the cam 50 the plunger 61 is raised, thereby releasing the snap from the block 71 and the side dies 60. Pivoted on the shaft 47, at the rear of the machine, is an arm 180, having side projections 181, which lie in the path of cam projections 49 on cams 50 and 155. By means of a link 182 the arm 180 is connected to a bell-crank lever 183, which is pivoted at 184 to the plate 35. The bell-crank lever is normally held in the position shown in Fig. 5 by a spring 185. At the lower end of the bell-crank lever 183 there is connected a plunger-rod 186, which passes through the plate 35. The forward end of said plunger carries upper and lower plates 187 and 188, the lower plate 188 being bifurcated to span the lip 58, the upper plate 187 reaching over said lip. The upper plate 187 has a shoulder 189, which abuts against the plate 35, thereby limiting its rearward movement. By the action of the cam projections 49 striking the projections 181 on the arm 180 the plunger 186 and plates 187 and 188 are thrown forward, striking the snap and releasing it from the lip 59.

Although a complete description is given above, I will briefly describe the successive steps in their order in the formation of a completed snap. A suitable length of wire, as shown at a in Fig. 1, is cut off by cut-off dies 37 and 40, after which said dies recede. The plunger 61 now moves downward and the wire is bent between dies 60 to the position shown at b, Fig. 1. The wire from the position is crossed at c, Fig. 1, by dies 74 and 75. During this operation the hook-bending dies 91 and 92 have moved to their lower positions, and the ends 95 of the wire lie in a position to be bent around the pins 93 and 109. The hooks are now formed through the operations of dies 91 and 92, as shown at d, Fig. 1. Before the dies 91 and 92 return to their upper positions the hooks are removed from the dies and bent to position shown at e, Fig. 1, by the inward movement of slides 135 and 136. The necessary twist is now given through the clutch mechanism, and the snap is completed, as at f, Fig. 1. As the cutting-dies 37 and 40 are being moved to cut off the next length of wire they bring with them the tension-slides 172, which spring the wire, as shown at g, Fig. 1. The snap is now released from the machine by the action of the kick-off mechanism and is completed, as shown at h, Fig. 1. The tension-slides 172 return to their outer positions as the cutting-dies move outward after completing the next cut.

Having described my invention, I claim—

1. In a machine for making harness-snaps, a loop-forming lip below which the wire is fed, bending-dies between which said forming-lip moves, means for actuating said forming-lip to bend the ends of the wire parallel with each other, and means for regulating the tension of the twisted part of the finished snap.

2. In a machine for making harness-snaps, a loop-forming lip, a plunger on which said forming-lip is supported, a lever for actuating said plunger, a cam for actuating said lever, a connection between said lever and said cam, and means for regulating the tension of the twisted portion of the finished snap.

3. In a machine for making harness-snaps, bending-dies to which the wire is fed, a loop-forming lip movable between said dies and below which the wire is fed, a plunger upon which said loop-forming lip is mounted, means for cutting the wire into the requisite length, means for receding said cutting mechanism after its cutting operation is performed, and means for actuating the plunger whereby the loop-forming lip is moved to bend the ends of the wire at right angles to the central portion thereof.

4. In a machine for making harness-snaps, means for cutting the wire to the requisite length, means for bending said wire so that the ends will lie parallel, means for crossing said parallel ends, and means for regulating the tension of the twisted part of the finished snap.

5. In a machine for making harness-snaps, stationary bending-dies, a loop-forming lip movable between said bending-dies, means for feeding the wire above said bending-dies and below the loop-forming lip, means for cutting said wire to the requisite length, means for actuating said loop-forming lip to cause the wire to engage the bending-dies and thereby bend the ends of said wire to parallel positions, and bending-dies engaging said parallel ends to cross the same.

6. In a machine for making harness-snaps, stationary bending-dies, and a loop-former movable between said bending-dies, means for feeding the wire between said bending-dies and said loop-former, means for cutting said wire into the requisite length, variable movable bending-dies engaging the wire when the latter is bent to a parallel position, said variable movable dies engaging the parallel ends to move them to crossed positions.

7. In a machine for making harness-snaps, stationary bending-dies, a loop-former movable between said bending-dies to bring the ends thereof in parallel positions, variable movable bending-dies engaging the wire when the latter is bent to such position to move them to crossed positions, and means for imparting such variable movement to said dies.

8. In a machine for making harness-snaps, means for giving the wire-stock its initial bend to bring the ends thereof in parallel positions, bending-dies engaging said parallel ends to move them to crossed positions, means for forming hooks on the ends of said wire-stock, means for twisting the parallel portions, and means for imparting the desired tension to said twisted portions.

9. In a machine for making harness-snaps, means for giving the wire-stock its initial bend to move the ends thereof to parallel positions, bending-dies for moving said ends to crossed positions, hook-forming dies movable to an operative position when the bending-dies have crosesd the wire, means for actuating said hook-forming dies to form said hooks, means for twisting the parallel members at the point where they cross, and means for imparting the desired tension to the twisted part of the finished snap.

10. In a machine for making harness-snaps, means for giving the wire-stock its initial bend to move the ends of the wire to parallel positions, bending-dies for moving said parallel ends to crossed positions, hook-forming dies movable to operative positions when the bending-dies have crossed the wire, means for actuating said hook-forming dies to form the hooks on the ends of the wire, means for disengaging the hooks from said hook-forming dies, means for twisting the crossed portions of the stock, and means for imparting the requisite tension to the twisted portion.

11. In a machine for making harness-snaps, mechanism for bending the stock in its initial position with the ends thereof parallel, bending-dies engaging said parallel ends to cross the same, hook-forming dies movable to operative positions when the bending-dies have completed the crossing of the wire, means for actuating said hook-forming dies, and common means for disengaging the hooks from said dies and for bringing said hook ends in proximity to each other.

12. In a machine for making harness-snaps, means for bending the wire-stock to bring its ends in parallel positions, further means for crossing said parallel ends, means for forming hooks upon said crossed ends, means for moving said hook ends in proximity to each other, means for engaging said ends above the crossed portion and twisting the same, and means for imparting the requisite tension to the twisted portion of the finished snap.

13. In a machine for making harness-snaps, means for initially bending the wire-stock to bring its ends parallel, further means for crossing said parallel ends, means for forming hooks upon said crossed ends, means for moving said hook ends in proximity to each other, means for engaging said ends to twist the same, means for compressing the twisted portion of the snap to bring the extreme ends of the hooks parallel with the sides, and means for imparting the requisite tension to the twisted portion of the finished snap.

14. In a machine for making harness-snaps, mechanism for initially bending the wire-stock to a position with the ends parallel, bending-dies engaging said parallel ends to cross the same, means for forming hooks on the ends of said stock, means for twisting said ends in the body portion thereof, means for imparting the requisite tension to the twisted portion of the finished snap, and means for removing said snap from the machine after its completion.

15. In a machine for making harness-snaps, means for initially bending the wire stock to bring its ends in parallel positions, means for crossing said parallel ends to provide a loop, means for forming hooks on the ends opposite the loop, means for twisting said wire in its middle portion to complete the snap, and means for imparting the requisite tension to the twisted portion of the finished snap.

16. In a machine for making harness-snaps, means for initially bending the wire-stock to bring the ends thereof in parallel positions, means for crossing said ends whereby a loop is formed in one end of the snap, said crossed portions lying apart, means for forming hooks on the ends of said wire opposite the loop, means for bringing said hook ends in proximity to each other after the formation of the hooks, clutch mechanism engaging the wire above the crossed portion to twist the same, said clutch mechanism having means which descends between the crossed portions, and around which the wire is twisted to form an open or loose twist.

17. In a machine for making harness-snaps, mechanism for bending the wire-stock to a suitable position for twisting the same, means for twisting said wire in its middle portion whereby a strap-loop is formed at one end of the snap, and a hitching-loop is formed at the other end, means for imparting the requisite tension to the twisted portion of the finished snap, twisting mechanism consisting of a clutch, and means upon said clutch for forming an open twist in the body of the snap.

18. In a machine for making harness-snaps, mechanism for bending the wire-stock into a position to be twisted, and twisting mechanism consisting of a clutch which engages the ends of the wire to twist the same, said clutch having a descending movement and a rotary movement simultaneously, whereby the coils of the twist are uniform, and means on said clutch for separating the coils of the twist whereby a loose twist is formed.

19. In a machine for making harness-snaps, mechanism for bending the wire-stock into a position to be twisted, clutch mechanism for forming a twist in the body of said wire, means for rotating said clutch when engaging the wire to form the twist therein, threads upon the shaft of said clutch, said threads engaging threads in the clutch-support, whereby a uniform movement is given the clutch while twisting the wire so that the coils of the twist shall be uniform, and a rod upon the lower extremity of said clutch around which the twist is formed, and whereby the coils of said twist are open when the snap is completed.

20. In a machine for making harness-snaps, means for crossing the ends of the wire to form a loop in one end, means for forming hooks on the ends of said wire, means for moving the ends of the wire after the hooks are formed to positions to be twisted, and means for engaging said ends adjacent to their crossed positions to form the twist therein, said twisting mechanism also having means around which the twist is formed and whereby an open twist is produced.

21. In a machine for making harness-snaps, mechanism for bending the wire to a suitable position to be twisted, a forming-lip around which the wire is bent to form a loop, in one end, means for twisting said wire in the middle portion thereof, and means for imparting the requisite tension to the twisted portion of the finished snap.

22. In a machine for making harness-snaps, mechanism for bending the wire to positions with the ends thereof crossing each other, means for forming hooks on the ends of said wire, means for forming a loose twist in the middle portion of said wire, means for compressing said twisted portion to bring the extreme ends of the hooks in positions to engage the adjacent sides of the snap after the twist is made, and means for imparting the requisite tension to the twisted portion of the finished snap.

23. In a machine for making harness-snaps, means for bending the wire in a position for its ends to be crossed, means for crossing said ends, means for forming hooks on the ends of said wire, means for placing said ends, after the hooks are formed, in a position to be twisted, means for twisting said ends, and means for imparting the requisite tension to the twisted portion of the finished snap.

In testimony whereof I affix my signature in presence of two witnesses.

FREDERICK J. NUTTING.

Witnesses:
R. J. McCarty,
C. M. Theobald.